US008583917B2

United States Patent
Parkinson

(10) Patent No.: US 8,583,917 B2
(45) Date of Patent: Nov. 12, 2013

(54) DISTRIBUTION OF CERTIFICATION STATEMENTS INTO REPOSITORY

(75) Inventor: Steven W. Parkinson, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 1512 days.

(21) Appl. No.: 11/607,767

(22) Filed: Nov. 30, 2006

(65) Prior Publication Data

US 2008/0133908 A1 Jun. 5, 2008

(51) Int. Cl.
*H04L 29/06* (2006.01)

(52) U.S. Cl.
USPC ........... 713/158; 713/155; 713/156; 380/279; 380/282

(58) Field of Classification Search
USPC .......................................................... 713/158
See application file for complete search history.

(56) References Cited

U.S. PATENT DOCUMENTS

| | | | |
|---|---|---|---|
| 6,321,333 B1* | 11/2001 | Murray | 713/156 |
| 6,970,862 B2* | 11/2005 | Kwan | 707/3 |
| 6,996,711 B2* | 2/2006 | Patterson et al. | 713/156 |
| 7,047,404 B1* | 5/2006 | Doonan et al. | 713/156 |
| 7,392,380 B2* | 6/2008 | Kaji et al. | 713/158 |
| 2005/0154878 A1* | 7/2005 | Engberg et al. | 713/157 |
| 2005/0154879 A1 | 7/2005 | Engberg et al. | |
| 2005/0193204 A1 | 9/2005 | Engberg et al. | |

OTHER PUBLICATIONS

Marias, G. F., K. Papapanagiotou, and P. Georgiadis. "Caching Alternatives for a MANET-Oriented OCSP Scheme." Dept. of Informatics and Telecommunications, University of Athens, Greece. IEEE (2005).*

Marias, G. F., K. Papapanagiotou, and P. Georgiadis. "ADOPT. A Distributed OCSP for Trust Establishment in MANETs." 11th European Wireless Conference 2005—Next Generation Wireless and Mobile Communications and Services (European Wireless), Publication Year: 2005, pp. 1-7.*

"Whitepaper: Vulnerability Analysis of Certificate Validation Systems" 2006, 15 pages, Corestreet.

* cited by examiner

*Primary Examiner* — Taghi Arani
*Assistant Examiner* — Narciso Victoria
(74) *Attorney, Agent, or Firm* — Lowenstein Sandler LLP

(57) ABSTRACT

A method and apparatus for distributing certification statements. Digital certificates are stored in a plurality of entries in a repository. Certification statements that include revocation status information for the stored digital certificates are received and stored in corresponding entries of the repository. Upon receiving a client request for a digital certificate, the digital certificate and corresponding revocation status information is sent to the client.

21 Claims, 5 Drawing Sheets

DISTRIBUTION OF CERTIFICATION STATEMENTS INTO REPOSITORY

TECHNICAL FIELD

Embodiments of the present invention relate to distribution of certificate revocation information, and more specifically to organizing certification statements along with digital certificates in a repository.

BACKGROUND

In cryptographic systems such as a public key infrastructure (PKI), certificates are used to encrypt messages such that only a holder of a specific certificate can read the message. Certificates are also used to digitally sign information to prove that the certificate holder is the source of the information. To encrypt a message so that only a particular certificate holder can read it, the public key of the certificate holder needs to be obtained.

FIG. 1 illustrates a conventional system architecture 100 for obtaining and verifying certificate information. The system architecture 100 includes a Lightweight Directory Access Protocol (LDAP) server 103, a client 105, an OCSP responder 107, and an exemplary certificate owner Tom Jones 110.

Client 105 makes a certificate query 178 to the LDAP server 103 to find the certificate belonging to a particular user identity (e.g., Tom Jones). The LDAP server 103 includes an LDAP directory 114 having numerous entries, each entry listing a user identity 116 and a certificate 118. If the requested certificate is stored in the LDAP directory 114, then the LDAP server 103 returns a query response 180 that includes the certificate. For example, a certificate query for certificates belonging to Tom Jones would return certificate 344.

Client 105 then submits an OCSP response query 172 to the OCSP responder 107 in order to determine the revocation status on the certificate. The OCSP responder 107 generates an OCSP response 124 and returns an OCSP response transmittal 173 to the client 105. If the OCSP response 124 indicates that the certificate has not been revoked, then the client 105 uses an encrypter 130 and a public key contained in the certificate to encrypt 183 a message 132. The encrypted message is then sent 185 to the certificate owner, Tom Jones 110.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
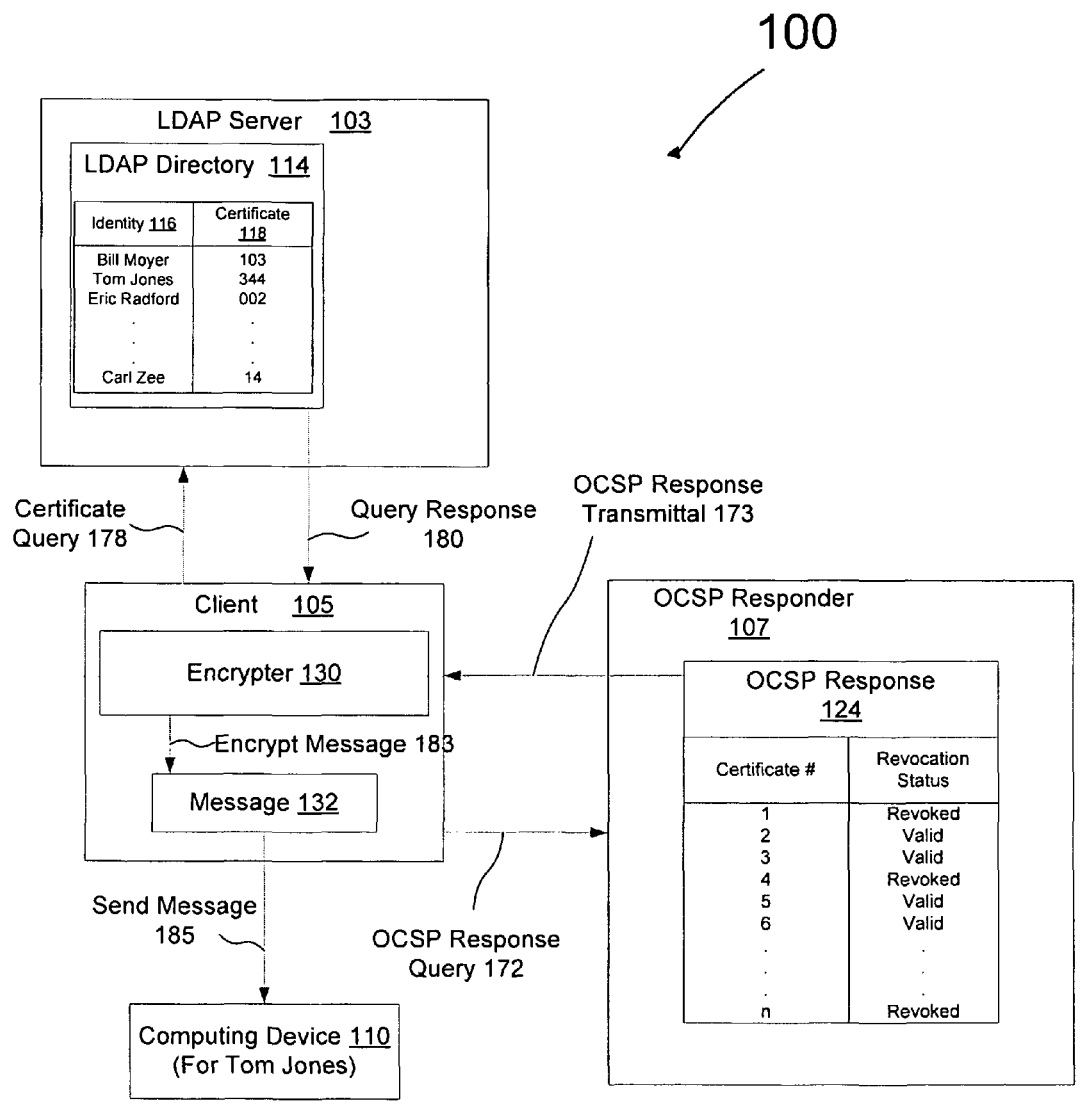
FIG. 1 illustrates a block diagram of a conventional system architecture.

Described herein is a method and apparatus for distributing OCSP responses. In one embodiment, certificates and OCSP responses including revocation status information for the certificates are stored in entries of a repository. In one embodiment, the OCSP responses are stored in corresponding entries of the repository when they are received. When a client request for a certificate is made, the certificate and the corresponding revocation status information may be sent to the client.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable medium having stored thereon instructions, which may be used to program a computer system (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Herein below, embodiments of the invention are discussed that optimize distribution of certificate revocation information using an online certificate status protocol ("OCSP," described in Internet Engineering Task Force ("IETF") Request for Comments ("RFC") document number 2560, published June 1999). Specific embodiments discuss OCSP responses, OCSP responders, and relying parties (OCSP clients). However, embodiments of the present invention may use other protocols and/or standards for the distribution of certificate information as well. In such alternative protocols, certification statements other than OCSP responses may be used, servers may be other than OCSP responders, and clients are not limited to OCSP clients. Examples of alternative protocols that may be used by embodiments of the present invention include, but are not limited to, certificate management protocol (CMP), XML key management specification (XKMS), and simple certificate validation protocol (SCVP).

Figure 2:
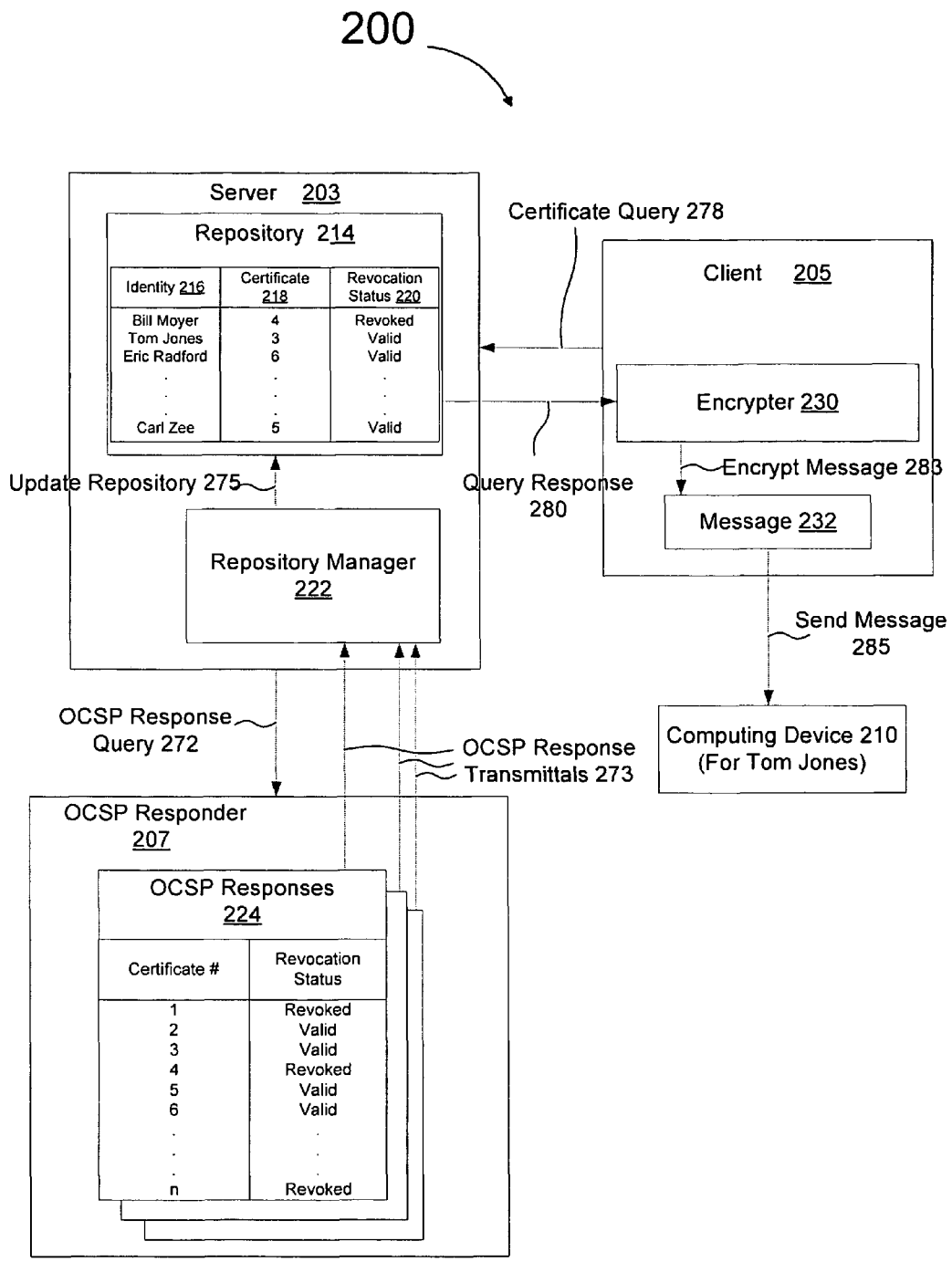
FIG. 2 illustrates a diagrammatic representation of a network architecture in which embodiments of the present invention may operate.

FIG. 2 illustrates an exemplary network architecture 200 in which embodiments of the present invention may operate. The network architecture 200 may include a server 203, an OCSP responder 207, a client 205, and a computing device 210 of a certificate owner (e.g., Tom Jones), connected via a network (not shown). The network may be a public network (e.g., Internet) or a private network (e.g., using an Ethernet or a local area network (LAN)). The client 205 (and the computing device 210) may be, for example, a personal computer (PC), mobile phone, palm-sized computing device, personal digital assistant (PDA), etc.

Client 205 may include an encrypter 230 that can be used to encrypt 283 a message 232 to Tom Jones, provided that the client 205 has access to a cryptographic key. The cryptographic key used to encrypt the message should be a public key that is the counterpart to a private key held by the intended message recipient (e.g., Tom Jones). The public key may be contained in a certificate (e.g., PKIX certificate or X.509 certificate) that is digitally signed by a certificate authority to bind the public key with the intended recipient's identity. Messages encrypted with the public key can be decrypted only by the corresponding private key, ensuring privacy and security.

If the client 205 does not already possess the intended recipient's certificate (and therefore his public key), the certificate can be obtained from server 203 via a certificate query 278. The certificate query 278 can request a certificate associated with a specific name, email address, domain name, URL, physical address, and/or other identifier.

In one embodiment, the client 205 communicates with the server 203 via a web server (not shown). For example, the client 205 may host a web browser that communicates with the web server using HTTP to request information. The web server may then communicate with the server 203 using a protocol such as LDAP or DNS to retrieve requested information. Alternatively, the client 205 may communicate directly with the server 203.

A query response 280 can be sent to the client 205 that includes the queried certificate and a revocation status for the queried certificate, as described in more detail below. This can eliminate any need for the client 205 to make a separate OCSP response query to the OCSP responder 207. If the revocation status indicates that the certificate is valid, then the client 205 can use the certificate's public key to encrypt 283 the message 232 with the assurance that only the intended recipient will be able to decrypt it. The client can then send the message 285 to the intended recipient (e.g. the computing device 210 for Tom Jones).

The server 203 may generate the query response by accessing a repository 214 that stores certificate information. The server 203 may be an LDAP server, DNS server, OCSP responder, certificate authority, or other server type.

The repository 214 may be, for example, an LDAP directory, a directory access protocol (DAP) directory or a domain name system resource directory (DNSRD). The repository 214 may be part of the server 203, or it may reside externally (e.g., on a separate database server). Information in the repository 214 may be organized in one or more formats (e.g., as a tree of data entries, or as a basic list).

Each entry in the repository 214 may include a certificate 218 and certificate holder identity 216, as well as an email address, domain name, IP address, URL, physical address, certificate revocation status 220, etc. The repository 214 may be searched by one or more search criteria, which may correspond to the types of information stored in repository entries. For example, the repository 214 may be searched to determine whether it contains a certificate belonging to Tom Jones. In the illustrated embodiment, such a search would show that a certificate for Tom Jones is stored in the repository 214, that it has certificate serial number 3, and that the certificate is valid (has not been revoked).

The server 203 may also include a repository manager 222 that keeps certificate information in the repository 214 updated. The repository manager 222 may be part of the server 203 or some other device and/or program, or be an independent module implemented in hardware, software or a combination thereof. The repository manager 222 can add new entries to the repository 214, remove entries, update entries, or perform other functions. In one embodiment, the repository manager 222 updates one or more entries by adding certificate revocation status 220. To maintain current certificate revocation status for repository entries, the repository manager may update the entries on a periodic basis, such as daily, twice a day, etc. In an alternative embodiment, the repository manager 222 may update the revocation status for specific entries when the client 205 makes a certificate query 278 for the certificates corresponding to those entries.

The repository manager 222 may obtain up to date certificate revocation information from an OCSP responder 207 by issuing an OCSP response query 272. In response, the OCSP responder 207 may send one or more OCSP response transmittals 273, each of the OCSP response transmittals 273 containing one or more OCSP responses 224. Alternatively, the OCSP responder 207 may automatically issue OCSP response transmittals 273 to the server when new revocation information becomes available (e.g., when a new certificate revocation list is released by a certificate authority).

Each OCSP response is signed by the OCSP responder 207 to guarantee its validity. The OCSP responses 224 may each include revocation status information on a single certificate, or on multiple certificates. When "singular" OCSP responses (responses containing a single certificate) are received by the server 203, the repository manager 222 may place them in appropriate entries in the repository 214 (corresponding to the certificate to which the OCSP response pertains).

The repository manager 222 may place "grouped" OCSP responses (OCSP responses having revocation information for multiple certificates) in each of the repository entries that correspond to a certificate identified in the OCSP responses 224. Alternatively, repository entries may be updated by including links to the appropriate OCSP responses 224, which can be stored in the repository 214 or elsewhere. This can reduce the need to store multiple copies of the OCSP responses 224.

The OCSP responses 224 can be pre-computed (pre-signed) OCSP responses or OCSP responses computed on the fly. Pre-computed OCSP responses may be used by the repository manager 222 to update repository entries on a periodic basis. Repository manager 222 may also update the revocation status for repository entries based on conventional OCSP responses upon client request. When a certificate query 278 is received, the server 203 may send an OCSP response query 272 regarding the queried certificate to the OCSP responder 207. When the server 203 receives an OCSP response transmittal, the OCSP response can be forwarded to the client 205 and stored in the repository 214.

In one embodiment, the server 203 is an OCSP responder. As an OCSP responder, the server 203 does not need to send OCSP response queries to obtain updated revocation status information. Instead, the server 203 can generate its own pre-computed or conventional OCSP responses for placement in the repository 214.

Figure 3:
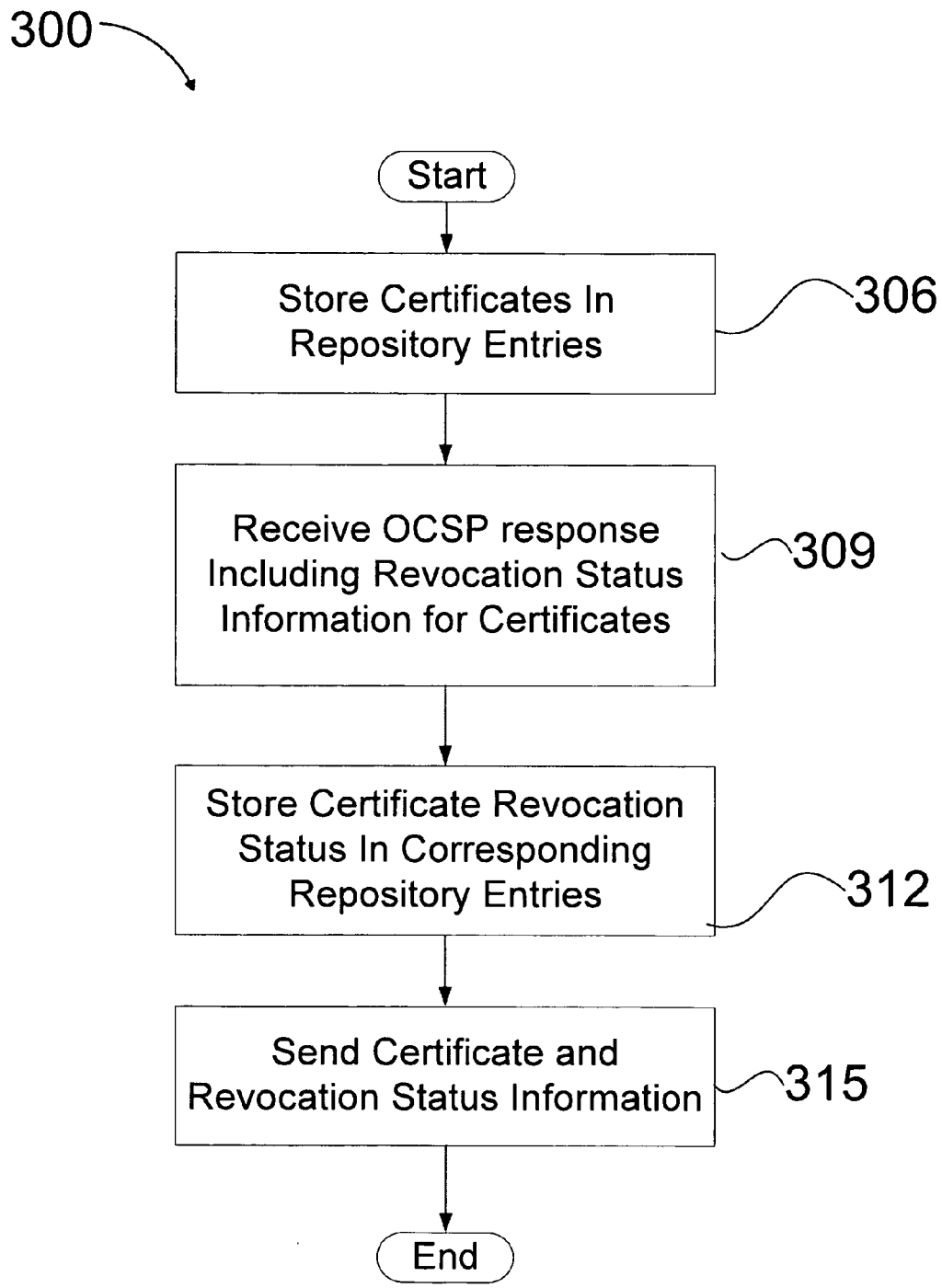
FIG. 3 illustrates a flow diagram of one embodiment of a method for managing certificate information.

FIG. 3 illustrates one embodiment of a method 300 for managing certificate information. The method may be performed by processing logic that may comprise hardware (e.g., circuitry, dedicated logic, programmable logic, microcode, etc.), software (such as instructions run on a processing device), or a combination thereof. In one embodiment, method 300 is performed by the server 203 of FIG. 2.

Referring to FIG. 3, at block 306 certificates are stored in repository entries. Certificates may be stored along with other information related to the certificates, such as certificate owner identifiers (e.g., name, IP address, email address, URL, etc.), certificate expiry date, etc.

At block 309, OCSP responses are received that include revocation status information for the stored certificates. The OCSP responses may include revocation information on one or more certificates, and may be pre-computed OCSP responses or dynamically generated OCSP responses. OCSP responses may be received periodically without a preceding OCSP response query. Alternatively, OCSP responses may be received in response to an OCSP response query.

At block 312, the certificate revocation status information is stored in the repository. The revocation status information is stored in such a manner so as to be associated with or linked to the certificates to which the revocation status information relates. In one embodiment, the OCSP responses are stored in the same repository entry as the related certificate. In an alternative embodiment, a pointer to the OCSP response is added to the repository entry storing the related certificate to make the OCSP response readily accessible.

At block 315, a certificate and revocation status information for that certificate are sent to a client. Sending the revocation status information may include sending a stored OCSP response to the client, or generating and signing a statement indicating the certificate revocation status.

Figure 4:
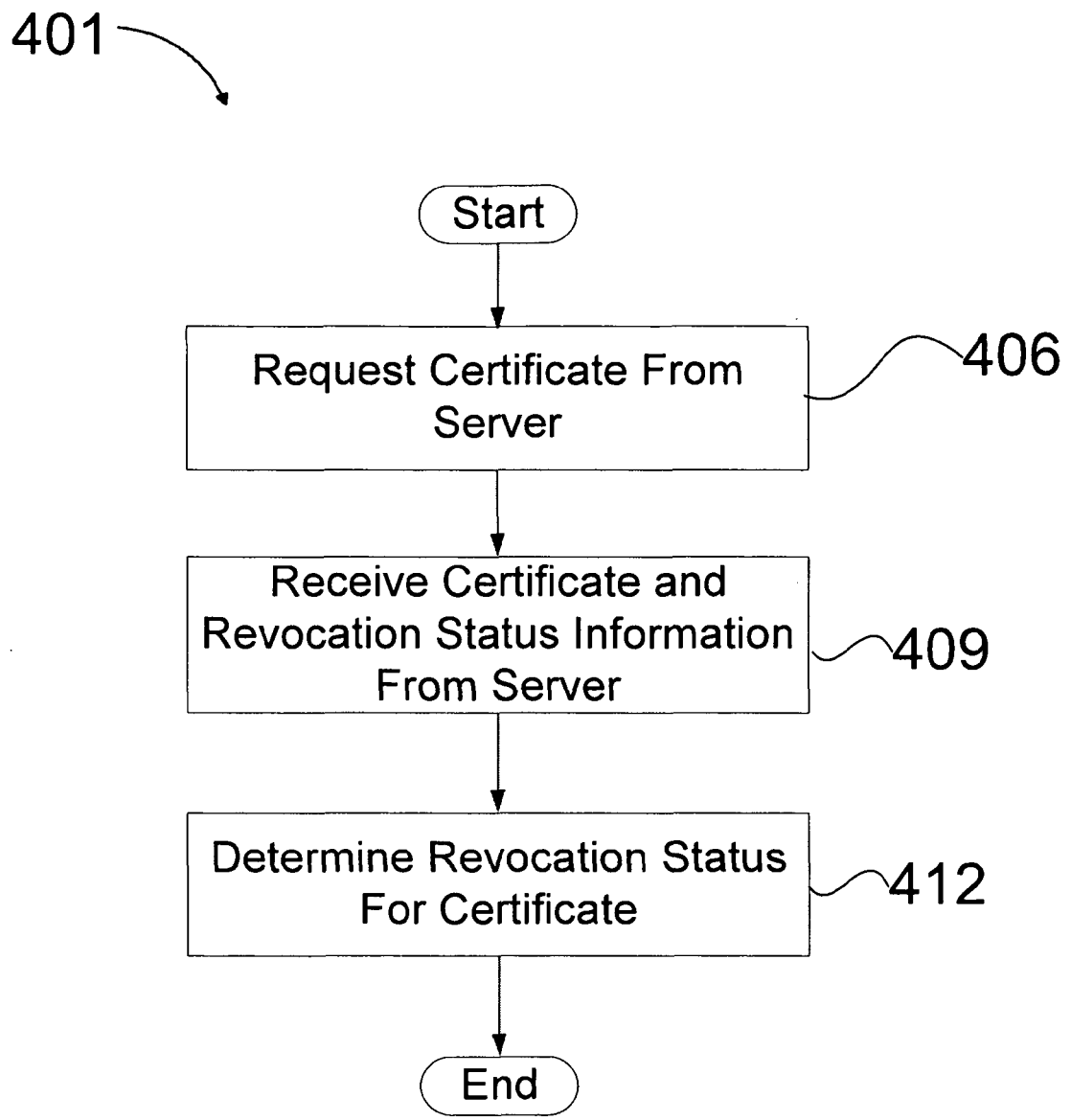
FIG. 4 illustrates a flow diagram of one embodiment of a method for obtaining a certificate and certificate revocation information.

FIG. 4 illustrates one embodiment of a method 400 for obtaining a certificate and certificate revocation information. The method may be performed by processing logic that may comprise hardware (e.g., circuitry, dedicated logic, programmable logic, microcode, etc.), software (such as instructions run on a processing device), or a combination thereof. In one embodiment, method 400 is performed by the client 205 of FIG. 2.

Referring to FIG. 4, at block 406 a certificate is requested from a server. At block 409, the certificate is received along with revocation status information from the server. The revocation status information may be in the form of an OCSP response, or other signed statement indicating certificate revocation status. At block 412, a revocation status for the certificate is determined. The revocation status may be determined without communicating with any additional servers (e.g., an OCSP responder or certificate authority). This can reduce network traffic to the OCSP responder and reduce the steps required to send encrypted messages.

Figure 5:
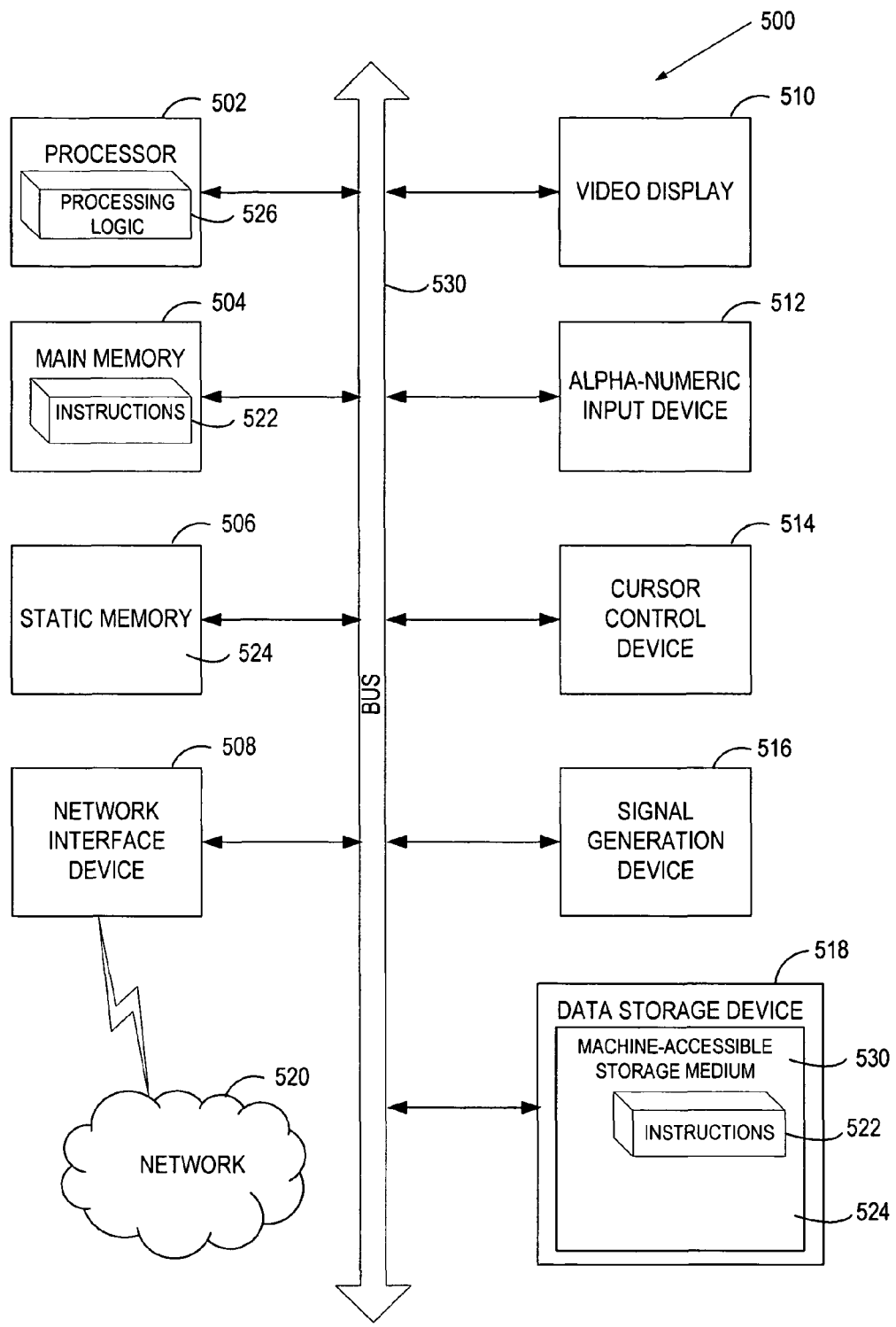
FIG. 5 illustrates a diagrammatic representation of a machine in the exemplary form of a computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Thus, a method and apparatus for creating new software packages in a second package format from original software packages in a first package format have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
storing digital certificates in a plurality of entries in a repository by a server computing device;
receiving pre-signed online certificate status protocol (OCSP) responses from an OCSP responder that include revocation status information for the digital certificates;
storing the pre-signed OCSP responses in entries of the repository corresponding to the digital certificates associated with the pre-signed OCSP responses;
receiving a request for a digital certificate from a remote client computing device that does not include the digital certificate or an OCSP response comprising revocation status information for the digital certificate; and
in response to the request, sending to the remote client computing device the digital certificate and a pre-signed OCSP response comprising the revocation status information for the digital certificate, wherein the pre-signed OCSP response is sent to the remote client computing device independent of a verification of a validity of the digital certificate.

2. The method of claim 1, wherein each of the digital certificates is an encryption certificate associated with a unique identity.

3. The method of claim 1, wherein the repository is maintained by an OCSP responder, the method further comprising:
generating the pre-signed OCSP responses by the OCSP responder.

4. The method of claim 1, wherein:
the server computing device is a lightweight directory access protocol (LDAP) server and the repository is an LDAP directory.

5. The method of claim 1, further comprising:
extracting revocation status information for a specific entry from the pre-signed OCSP response.

6. A method comprising:
requesting a digital certificate from a first server by a client computing device that does not include the digital certificate or an online certificate status protocol (OCSP) response, the first server comprising a plurality of pre-signed OCSP responses, wherein a particular pre-signed OCSP response of the plurality of pre-signed OCSP responses includes revocation status information corresponding to the digital certificate;
receiving the digital certificate and the particular pre-signed OCSP response from the first server in response to the request, wherein the particular pre-signed OCSP response is received independent of a verification of a validity of the digital certificate; and
determining the revocation status for the digital certificate based on the revocation status information.

7. The method of claim 6, wherein the particular pre-signed OCSP response is received without communicating with a second server.

8. The method of claim 7, wherein the second server is an OCSP responder.

9. The method of claim 6, wherein the first server is a lightweight directory access protocol (LDAP server, and wherein the digital certificate is initially stored in an LDAP directory on the LDAP server.

10. The method of claim 6, further comprising:
when the revocation status information indicates that the digital certificate has not been revoked, encrypting an article of information with a public key included in the digital certificate to yield an encrypted article of information and sending the encrypted article of information to a holder of the unique identity associated with the digital certificate.

11. A non-transitory machine-accessible medium having stored therein data that, when accessed by a machine, cause the machine to perform a method comprising:
storing digital certificates in a plurality of entries in a repository by a server computing device;
receiving pre-signed online certificate status protocol (OCSP) responses from an OCSP responder that include revocation status information for the digital certificates;
storing the pre-signed OCSP responses in entries of the repository corresponding to the digital certificates associated with the pre-signed OCSP responses;
receiving a request for a digital certificate from a remote client computing device that does not include the digital certificate or an OCSP response comprising revocation status information for the digital certificate; and
in response to the request, sending to the remote client computing device the digital certificate and a pre-signed OCSP response comprising the revocation status information for the digital certificate, wherein the pre-signed OCSP response is sent to the remote client computing device independent of a verification of a validity of the digital certificate.

12. The non-transitory machine-accessible medium of claim 11, wherein the repository is maintained by an OCSP responder, the data, when accessed by the machine, further cause the machine to perform a method comprising:
generating the pre-signed OCSP responses by the OCSP responder.

13. The non-transitory machine-accessible medium of claim 11, wherein the digital certificates area stored by a lightweight directory access protocol (LDAP) server and the repository is an LDAP directory.

14. The non-transitory machine-accessible medium of claim 11, wherein the data, when accessed by the machine, further cause the machine to perform a method comprising extracting revocation status information for a specific entry from the pre-signed OCSP response.

15. A non-transitory machine-accessible medium having stored therein data that, when accessed by a machine, cause the machine to perform a method comprising:
requesting a digital certificate from a first server device by a client that does not include the digital certificate or an online certificate status protocol (OCSP) response, wherein the first server device contains a plurality of pre-signed OCSP responses, wherein a particular pre-signed OCSP response of the plurality of pre-signed OCSP responses includes revocation status information corresponding to the digital certificate;
receiving the digital certificate and the particular pre-signed OCSP response from the first server device in response to the request, wherein the particular pre-signed OCSP response is received independent of a verification of a validity of the digital certificate; and
determining a revocation status for the digital certificate based on the revocation status information.

16. The non-transitory machine-accessible medium of claim 15, wherein the particular pre-signed OCSP response is received without communicating with a second server.

17. The non-transitory machine-accessible medium of claim 16, wherein the second server is an OCSP responder.

18. The non-transitory machine-accessible medium of claim 15, wherein the first server device is a lightweight directory access protocol (LDAP server, and wherein the digital certificate is initially stored in an LDAP directory on the LDAP server.

19. A system, comprising:
a memory having stored therein instructions for a directory server; and
a processor, connected with the memory, to execute the instructions, wherein the instructions cause the processor to:
store digital certificates in a plurality of entries in a repository;
receive pre-signed online certificate status protocol (OCSP) responses comprising revocation status information for the digital certificates;
store the pre-signed OCSP responses in entries of the repository corresponding to the digital certificates associated with the pre-signed OCSP responses;
receive a request for a digital certificate from a client computing device that does not include the digital certificate or an OCSP response comprising revocation status information for the digital certificate; and
in response to the request, send to the client computing device the digital certificate and a pre-signed OCSP response comprising revocation status information for the digital certificate, wherein the pre-signed OCSP response is sent to the client computing device independent of a verification of a validity of the digital certificate.

20. The system of claim 19, further comprising:
the client computing device, connected with the server computing device via a network, to request the digital certificate, associated with a unique identity, from the server, to receive the digital certificate and the pre-signed OCSP response comprising the revocation status information for the digital certificate from the server, and to determine a revocation status for the digital certificate based on the revocation status information included in the pre-signed OCSP response.

21. The system of claim 19, wherein the repository is a lightweight directory access protocol (LDAP) directory.

* * * * *